United States Patent Office 3,331,819
Patented July 18, 1967

3,331,819
POLYMERS
James D. Spainhour, Bartlesville, Okla., assignor to Phillips Petroleum Company, a corporation of Delaware
No Drawing. Filed Oct. 17, 1963, Ser. No. 317,036
6 Claims. (Cl. 260—79.3)

ABSTRACT OF THE DISCLOSURE

Copolymers of $SO_2$ and an olefin are prepared by copolymerizing $SO_2$ and an olefin of the group consisting of polycyclic olefins and alkenylcycloalkanes in the presence of a free radical initiator.

---

This invention relates to novel resins and a process for their production. More particularly, this invention relates to novel resins from $SO_2$ and non-conjugated polyenes.

In the past, considerable work has been carried out in the formation of polymers by the reaction of olefins with $SO_2$. A great variety of olefins have been polymerized with $SO_2$, and the study of these polymers has been widely reported in the literature. Considerable interest has developed in these polymers because of the ready availability and low cost of the starting materials. These polymers frequently were not sufficiently stable to permit certain relatively high-temperature use in commercial applications.

Accordingly, an object of this invention is to provide novel resins of $SO_2$ and cyclic compounds containing non-conjugated multiple unsaturation.

Another object of this invention is to provide a process for producing novel stable resins of $SO_2$ and cyclic compounds containing non-conjugated multiple unsaturation.

Other objects, advantages and features of the invention will be readily apparent to those skilled in the art from the following disclosure and the appended claims.

According to the process of the invention, novel polymers are prepared by contacting $SO_2$ with a non-conjugated polyene compound having a cyclic nucleus which contains from 6 to 30 carbon atoms, inclusive, with not more than 16 carbon atoms in a ring. The term "cyclic" includes monocyclic and polycyclic compounds.

The cyclic non-conjugated polyenes which can be treated with $SO_2$ to form polymers according to the inventive process are represented by the formulas:

Formula I

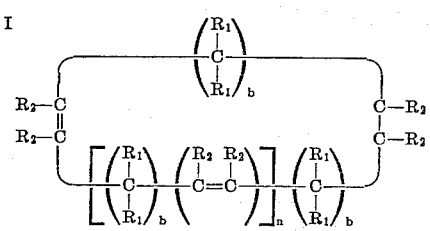

Formula II

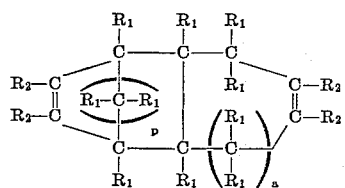

Formula III

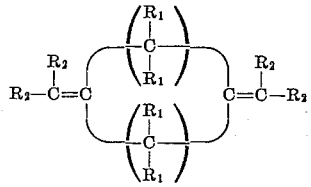

wherein each $R_1$ is selected from the group consisting of hydrogen, cyano, hydroxy, chloro, bromo, fluoro, carboxy, and alkyl, aryl and cycloalkyl radicals containing from 1 to 10, inclusive, carbon atoms,

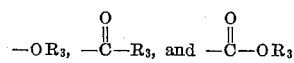

wherein $R_2$ is selected from the group consisting of hydrogen, cyano, chloro, bromo, fluoro, carboxy, and alkyl, aryl, and cycloalkyl radicals containing from 1 to 10, inclusive, carbon atoms.

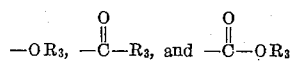

wherein each $R_3$ is selected from the group consisting of alkyl, aryl, and cycloalkyl radicals containing from 1 to 10 carbons atoms, inclusive, wherein $a$ is selected from the group consisting of 0, 1, 2, 3 and 4; wherein $b$ is selected from the group consisting of 1,2,3 and 4; wherein $n$ is an integer of the group 0, 1 and 2; wherein when $b$ is 1, the $R_1$'s in the functions

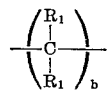

cannot be hydrogen, wherein when one $R_1$ on a group

is hydroxy, the other $R_1$ is selected from the group consisting of hydrogen, carboxy, 1 to 10 carbon atoms containing alkyl, aryl, cycloalkyl radicals,

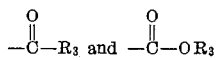

wherein said compounds must contain at least two carbon-to-carbon double bonds separated by not more than 3 ring atoms, wherein at least one of the $R_2$'s attached to the carbon atoms connected to each other by a double bond must be hydrogen in each of the

functions; wherein the number of carbon atoms in said compounds does not exceed 30; wherein the number of carbon atoms in the nuclei does not exceed 16; and wherein not more than six of the $R_1$ and $R_2$ substituents can be some function other than hydrogen.

Specific examples of compounds of the above general formulas are:

3,3-dichloro-1,4-cycloheptadiene,
1,5-cyclooctadiene,
3,3-dimethyl-1,4-cycloheptadiene,
1,4-dichloro-1,5-cyclooctadiene,
1,5-dichloro-1,5-cyclooctadiene,
1,5-dicyano-1,5-cyclooctadiene, 3-hydroxy-8-n-decyl-1,5-cyclononandiene,
1,3,4,5-tetrabromo-7-carboxy-1,5-cyclooctadiene,
2,3-dicyclohexyl-1,5-cyclodecadiene,
1,5-diphenyl-1,5-cyclooctadiene,
3-fluoro-4-tert-butyl-1,6-cycloundecadiene,
2-acetyl-4-sec-octyl-1,5-cyclononadiene,
3-carbethoxy-7-benzoyl-1,5-cyclooctadiene,
3-carbdecoxy-3-(4-methylcyclohexyl)-1,5-cyclooctadiene,
trans,trans,cis.-1,5,9-cyclododecatriene,
1,5,9-trimethyl-trans,trans,trans-cyclododecatriene,
1,5,9,13-cyclohexadecatetraene,
1,3,4,5,7-penta-n-butyl-1,5-cyclodecadiene,
di(cyclopentadiene),
di(methylcyclopentadiene),
1,2,4,5-tetramethyl-3a,4,7,7a-tetrahydro-4,7-ethanoindene,
1,4-dimethylenecyclohexane,
1,6-dimethylenecyclodecane,
1,5-dimethyl-1,5-cyclooctadiene,
1,5-dimethoxy-1,5-cyclooctadiene,
1,5-dicarbethoxy-1,5-cyclooctadiene,
1,4-diphenyl-1,5-cyclooctadiene,
1,4-dimethyl-1,5-cyclooctadiene,
1,4-dicyano-1,5-cyclooctadiene,
1-acetyl-1,5-cyclooctadiene,
1-phenyl-1,5-cyclooctadiene,
1-methyl-1,5-cyclooctadiene,
1,5-cyclononadiene,
1,5,9-cyclododecatriene(trans,trans-trans),
1,5-cyclododecadiene,
1,5,9-trimethyl-1,5,9-cyclododecatriene,
1,5,9-trimethyl-1,5,9-cyclododecadiene,
1,4-dimthylene-cyclohexane, and
di(carbethoxycyclopentadiene), and the like.

The polymers which are prepared according to the inventive process contain 2 molecules of $SO_2$ per molecule of polyene compound. While the invention is not limited by any theory, it appears that one molecule of sulfur dioxide forms a bridge between two non-adjacent carbon atoms which in turn are attached to other carbons by an olefinic bond prior to polymerization, while the other molecule connects repeating nuclei. The polymer resulting from the copolymerization of 1,5-cyclooctadiene and $SO_2$ according to the process of the invention has repeating units of the following structure:

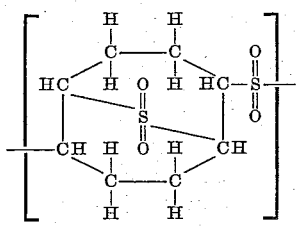

In conducting the polymerization, the mol ratio of $SO_2$ to polyene compound is generally in the range of from 1/10 to 10/1. However, since the polymer contains two mols of $SO_2$ per mol of polyene compound, it is preferred to employ at least a mol ratio of 2/1, and preferably a slight excess above this level, for example about 3/1. The polymerization is initiated by a free radical mechanism; thus conventional free radical initiators or redox systems can be employed. Examples of free radical initiators include peroxides such as benzoyl peroxide, hydroperoxides such as cumene hydroperoxide, ultraviolet light, ionizing radiation, or oxygen. While many types of redox systems can be employed, an example of a preferred redox initiator is a nitrate such as silver nitrate, an alkali metal nitrate or ammonium nitrates which form a redox catalyst with the $SO_2$ present in the reaction zone. The amount of initiator can be varied over a broad range, although the amount will generally range from 0.005 to 5 mol percent based on the cyclic polyene compound.

The polymerization is effected by contacting the polyene compound and $SO_2$ in the presence of one of the defined initiators at a temperature generally ranging from −50° to 100° C., although higher temperatures can be employed. A preferred temperature range is from −20° to 50° C. The polyene compound is normally maintained in the liquid phase, or in solution in a liquid diluent at the reaction conditions. The $SO_2$ can be employed as a liquid, in which case a reaction temperature of −20° C. or below should be employed if at atmospheric pressure; or the $SO_2$ can be employed in solution in a diluent or in the polyene reactant. Thus, as described, the polymerization reaction can be conducted as a bulk polymerization in which no diluent is required, or a reaction diluent can be employed which does not interfere with the reaction at the chosen conditions. Typical reaction diluents which can be employed include hydrocarbons such as pentane, heptane, cyclohexane, benzene, toluene and the like; ethers such as diethyl ether, p-dioxane and the like; alcohols such as methanol, ethanol and the like; sulfoxides such as dimethyl sulfoxide; sulfones such as tetrahydrothiophene-1,1-dioxide (sulfolane); and tertiary amides such as N-methylpyrollidone. The three most preferred diluents are sulfolane, dimethylsulfoxide and N-methylpyrollidone. By using these preferred solvents, higher molecular weight polymers can be obtained than are possible with other less polar diluents, and the polymer can be recovered from the reaction zone in solution.

The pressure in the polymerization zone is normally autogenous. Pressures up to 10 atmospheres or even higher can be employed if desired. Following the polymerization, the novel copolymers of this invention can be recovered by such methods as evaporation of the diluent, filtration, centrifugation, or by discharging a solution of the polymer is a water-miscible solvent into water or alcohol.

The polymers produced by the inventive process can be cast into structural shapes by solvent casting, or shaped items can be formed by plasticizing the polymer and thereafter molding the plasticized material. These polymers are particularly useful when it is desired to form a structural item requiring high optical clarity.

The following specific examples are intended to illustrate the advantages of the process and polymers of the invention. It is not intended, however, that the invention be limited to the specific features shown in the examples.

*Example 1*

A series of runs was carried out in which novel copolymers of 1,5-cyclooctadiene and sulfur dioxide were prepared.

In one run, 100 ml. of acetone, 10 ml. of an acetone solution containing 0.0069 gram of $LiNO_3$, 10.8 grams of 1,5-cyclooctadiene, and 27 grams of $SO_2$ were charged to a 7-ounce beverage bottle under a nitrogen atmosphere. The sealed bottle was then tumbled at room temperature (approximately 25° C.) for 24 hours. The contents of the bottle were poured into water, after which the polymer was filtered out of the mixture. After washing the polymer with water and methanol, followed by drying, it was found that the yield of polymer was practically quantitative based on the hydrocarbon monomer. The inherent viscosity of the polymer as determined on a solution of 0.5 gram polymer in 100 ml. dimethyl sulfoxide at 30° C. was 0.80.

In another run, 200 ml. of sulfolane, 10.8 grams of 1,5-cyclooctadiene, 30 grams of $SO_2$ and 10 ml. of oxygen gas were charged to a 12-ounce bottle under a nitrogen atmosphere. The sealed bottle was tumbled at room temperature for 24 hours and was then allowed to stand at room temperature for an additional 72 hours. The solid polymer was removed and comminuted in the presence of water. The resulting solid polymer was washed with water and methanol, then dried. The conversion of monomer to polymer was 97 percent based on the cyclooctadiene, and the inherent viscosity as determined by the method of the first run was 1.94.

In still another run, 200 ml. of sulfolane, 10.8 grams of 1,5-cyclooctadiene, 20 grams of $SO_2$ and 0.012 gram of benzoyl peroxide were charged to a 12-ounce bottle under a nitrogen atmosphere. The sealed bottle was stirred with a magnetic stirrer overnight at approximately 25° C., and then allowed to stand for 24 hours. The solid polymer resulting was chopped in the presence of water in the blendor and washed with water and methanol. A quantitative yield of polymer was obtained, and the polymer had an inherent viscosity, as determined above, of 1.37.

The above run was repeated except that the benzoyl peroxide was omitted, and the bottle and its contents were irradiated for 3 hours with a mercury-arc lamp. The bottle was then allowed to stand overnight, after which an additional four hours of irradiation were employed the following day. The bottle was again allowed to stand overnight, after which the product was chopped and washed as above. The dry weight of the polymer was 23.5 grams, representing a yield of 100 percent based on the hydrocarbon monomer. This polymer was brittle, water-white, resinous material of high optical clarity and had an inherent viscosity of 1.10 as determined by the method described.

A typical sample of the copolymer of $SO_2$ and 1,5-cyclooctadiene was examined by infrared analysis. This analysis showed no residual unsaturation in the polymer; the lack of residual unsaturation was confirmed by the fact that no reaction occurred when the polymer was contacted with bromine. The polymer was then subjected to elemental analysis. The results of this analysis are expressed below in Table I.

TABLE I

| Element | Analysis | Theoretical for—<br>1:1 $SO_2$:Cyclo-octadiene | Theoretical for—<br>2:1 $SO_2$:Cyclo-octadiene |
|---|---|---|---|
| C | 40.3 | 55.8 | 40.7 |
| H | 5.4 | 6.98 | 5.1 |
| S | 25.12 | 18.61 | 27.1 |
| O | [1] 29.18 | 18.61 | 27.1 |

[1] By difference.

It can be seen from the above that the polymer contained 2 molecules of $SO_2$ per molecule of cyclooctadiene. Furthermore, the polymer contained no residual unsaturation and had the structure described above.

Example II

In another series of runs, copolymers of $SO_2$ and di(cyclopentadiene) (3a,4,7,7a-tetrahydro-4,7-methanoindene) were formed by the method of the invention.

In one run, 30 ml. of water, 7.5 ml. of aqueous solution containing 0.3 gram of lithium nitrate, 9.5 ml. of aqueous solution containing 0.3 gram of sodium lauryl sulfate, 13.2 grams of di(cyclopentadiene), and 30 grams of $SO_2$ were charged to a 7-ounce beverage bottle under a nitrogen atmosphere. The sealed bottle was tumbled overnight at approximately 25° C. The emulsion was then diluted with methanol to precipitate the solid polymer. The solid polymer was separated by filtration, washed with water and methanol, and vacuum dried. The yield of polymer was 25 grams, having an inherent viscosity of 0.32 as determined on a solution of 0.5 gram of polymer in 100 ml. dimethylsulfoxide at 30° C.

In another run, 100 ml. of acetone, 5 ml. of acetone solution containing 0.0034 gram of lithium nitrate, 13.2 grams of di(cyclopentadiene), and 26.5 grams of $SO_2$ were charged to a 7-ounce beverage bottle under a nitrogen atmosphere. The sealed bottle was then tumbled at approximately 25° C. for 5 hours, after which the resulting slurry was filtered to recover the solid polymer. The polymer was then washed with water and methanol and vacuum dried. The yield of polymer was 18.7 grams of white solid having an inherent viscosity of 0.34 as determined by the method of the first run of this example.

In an additional run, 100 ml. of sulfolane, 5 ml. of a sulfolane solution containing 0.0034 gram lithium nitrate, 13.2 grams of di(cyclopentadiene), and 30.8 grams of $SO_2$ were charged to a 7-ounce beverage bottle under a nitrogen atmosphere. The sealed bottle was tumbled overnight at approximately 25° C. The contents were then chopped with water in the blendor, after which the polymer was washed with water and methanol and vacuum dried. The yield was 12.6 grams of white solid having an inherent viscosity of 0.51 as determined by the method of the preceding run.

The di(cyclopentadiene)-$SO_2$ polymers of this example contained no residual unsaturation as determined by infrared analysis and absence of reaction with bromine. An elemental analysis of a typical di(cyclopentadiene)-$SO_2$ polymer is given below in Table II.

TABLE II

| Element | Analysis | Theoretical for—<br>1:1 $SO_2$:Di(cyclopentadiene) | Theoretical for—<br>2:1 $SO_2$:Di(cyclopentadiene) |
|---|---|---|---|
| C | 46.0 | 61.3 | 46.2 |
| H | 4.9 | 6.1 | 4.6 |
| S | 23.0 | 16.3 | 24.6 |
| O | [1] 26.1 | 16.3 | 24.6 |

[1] By difference.

It can be seen from the above that the polymer formed contained 2 molecules of $SO_2$ per molecule of di(cyclopentadiene). Because of the lack of unsaturation, it is concluded that the $SO_2$ forms a transannular bridge.

Example III

A run is carried out in which a copolymer of 1,4-dimethylenecyclohexane and $SO_2$ is prepared. In this run, 200 ml. of sulfolane, 10.8 grams of 1,4-dimethylenecyclohexane, 30 grams of $SO_2$ and 0.0069 gram of $LiNO_3$ are charged to a 12-ounce beverage bottle under a nitrogen atmosphere. The sealed bottle is then tumbled at 25° C. for 24 hours. The contents of the bottle are then poured into water, and the solid polymer is filtered from the mixture. After drying, a polymer of the following structure is obtained:

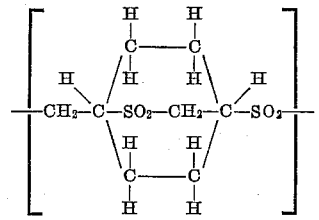

Reasonable variations and modifications of this invention can be made, or followed, in view of the foregoing, without departing from the spirit or scope thereof.

I claim:

1. A process for forming resins from $SO_2$ and nonconjugated polyenes which comprises reacting a cyclic nonconjugated polyene of the formula

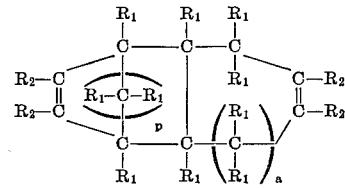

wherein each $R_1$ is selected from the group consisting of hydrogen, cyano, hydroxy, chloro, bromo, fluoro, carboxy, and alkyl, aryl, and cycloalkyl radicals containing from 1 to 10, inclusive, carbon atoms,

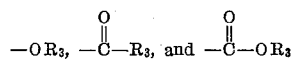

wherein $R_2$ is selected from the group consisting of hydrogen, cyano, chloro, bromo, fluoro, carboxy and alkyl, aryl, and cycloalkyl radicals containing from 1 to 10, inclusive, carbon atoms,

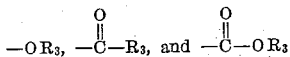

wherein each $R_3$ is selected from the group consisting of alkyl, aryl, and cycloalkyl radicals containing from 1 to 10 carbon atoms, inclusive; wherein $a$ is selected from the group consisting of 0, 1, 2, 3 and 4; wherein $p$ is selected from the group consisting of 1 and 2; wherein when one $R_1$ on a group

is hydroxy, the other $R_1$ is selected from the group consisting of hydrogen, carboxy, 1 to 10 carbon-atom-containing alkyl, aryl, and cycloalkyl radicals,

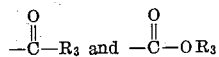

wherein said compounds must contain at least two carbon-to-carbon double bonds separated by not more than 3 ring atoms; wherein at least one of the $R_2$'s attached to the carbon atoms connected to each other by a double bond must be hydrogen in each of the

functions; wherein the number of carbon atoms in said compounds does not exceed 30; wherein the number of carbon atoms in the nuclei does not exceed 16; and wherein not more than six of the $R_1$ and $R_2$ substituents can be some function other than hydrogen, with $SO_2$ in the presence of a free radical initiator.

2. $SO_2$ polyene resins produced by the process of claim 1.

3. A novel $SO_2$-polyene resin according to the process of claim 1 wherein said polyene is dicyclopentadiene (3a,4,7,7a-tetrahydro-4,7-methanoindene).

4. A process for forming resins from $SO_2$ and nonconjugated polyenes which comprises reacting a cyclic nonconjugated polyene of the formula

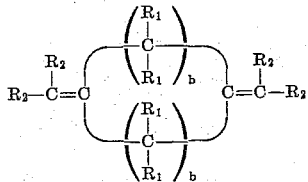

wherein each $R_1$ is selected from the group consisting of hydrogen, cyano, hydroxy, chloro, bromo, fluoro, carboxy, and alkyl, aryl and cycloalkyl radicals containing from 1 to 10, inclusive, carbon atoms,

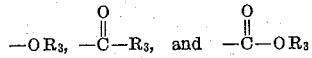

wherein $R_2$ is selected from the group consisting of hydrogen, cyano, chloro, bromo, fluoro, carboxy and alkyl, aryl, and cycloalkyl radicals containing from 1 to 10, inclusive, carbon atoms,

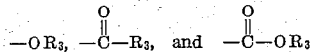

wherein each $R_3$ is selected from the group consisting of alkyl, aryl, and cycloalkyl radicals containing from 1 to 10 carbon atoms, inclusive; wherein $b$ is selected from the group consisting of 1, 2, 3 and 4; wherein $n$ is an integer of the group 0, 1 and 2; wherein when $b$ is 1, the $R_1$'s in the functions

cannot be hydrogen; wherein when one $R_1$ on the group

is hydroxy, the other $R_1$ is selected from the group consisting of hydrogen, carboxy, 1 to 10 carbon-atom-containing alkyl, aryl, and cycloalkyl radicals,

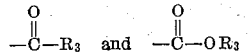

wherein said compounds must contain at least two carbon-to-carbon double bonds separated by not more than 3 ring atoms; wherein the number of carbon atoms in said compounds does not exceed 30; wherein the number of carbon atoms in the nuclei does not exceed 16; and wherein not more than six of the $R_1$ and $R_2$ substituents can be some function other than hydrogen, with $SO_2$ in the presence of a free radical initiator.

5. $SO_2$ polyene resins produced by the process of claim 4.

6. A novel $SO_2$-polyene resin according to the process of claim 4 wherein said polyene is 1,4-dimethylenecyclohexane.

References Cited

UNITED STATES PATENTS

| | | | |
|---|---|---|---|
| 2,258,702 | 10/1941 | Frey et al. | 260—79.3 |
| 3,084,146 | 4/1963 | Errede | 260—79.3 |
| 3,133,903 | 5/1964 | Frazer | 260—79.3 |
| 3,239,488 | 3/1966 | Butler | 260—79.3 |

FOREIGN PATENTS

| | | |
|---|---|---|
| 716,048 | 12/1954 | Great Britain. |

JOSEPH L. SCHOFER, *Primary Examiner.*

D. K. DENENBERG, *Assistant Examiner.*